United States Patent [19]

Yoshida

[11] Patent Number: 5,309,968
[45] Date of Patent: May 10, 1994

[54] TIRE CHAIN AND THE METHOD OF MOUNTING IT

[76] Inventor: Hirokazu Yoshida, 10-415, 13 Amijima-cho, Miyakojima-ku, Osaka-shi, Osaka 534, Japan

[21] Appl. No.: 968,574

[22] Filed: Oct. 29, 1992

[51] Int. Cl.⁵ .............................................. B60C 27/10
[52] U.S. Cl. ................. 152/219; 152/213 R; 152/241; 152/243
[58] Field of Search .................. 152/213 R, 217, 219, 152/243, 241

[56] References Cited

U.S. PATENT DOCUMENTS

| | | | |
|---|---|---|---|
| 1,800,147 | 4/1931 | Lee | 152/213 R |
| 2,012,404 | 8/1935 | Reyburn | 152/219 |
| 2,275,994 | 3/1942 | Ruhkala | 152/213 R |
| 2,316,718 | 4/1943 | Royer | 152/219 |
| 2,363,998 | 11/1944 | Royer | 152/219 |
| 2,431,709 | 12/1947 | Royer | 152/219 |
| 2,685,321 | 8/1954 | Petrie | 152/219 |

Primary Examiner—Michael W. Ball
Assistant Examiner—Francis J. Lorin
Attorney, Agent, or Firm—Wenderoth, Lind & Ponack

[57] ABSTRACT

A tire chain has an inside annular body, and a contractile connector including an elastic body connected and fixed to the inside annular body, a first connecting member and a second connecting member which are movable along the elastic body and are connectable, and a connecting and fixing tool which maintains a connected state of the connecting members. The first and the second connecting members are also connected to ends of the inside annular body. As the connecting members are moved along the elastic body, the effective length of the inside annular body changes due to the elastic body and thus, both ends of the inside annular body can be connected easily.

4 Claims, 9 Drawing Sheets

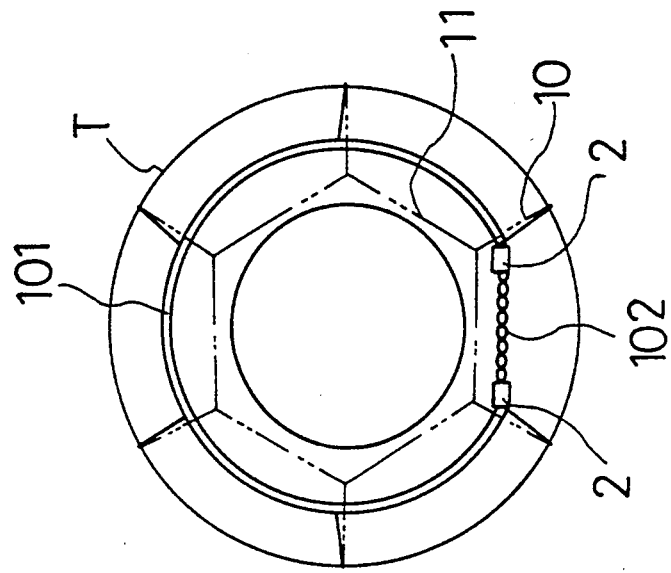
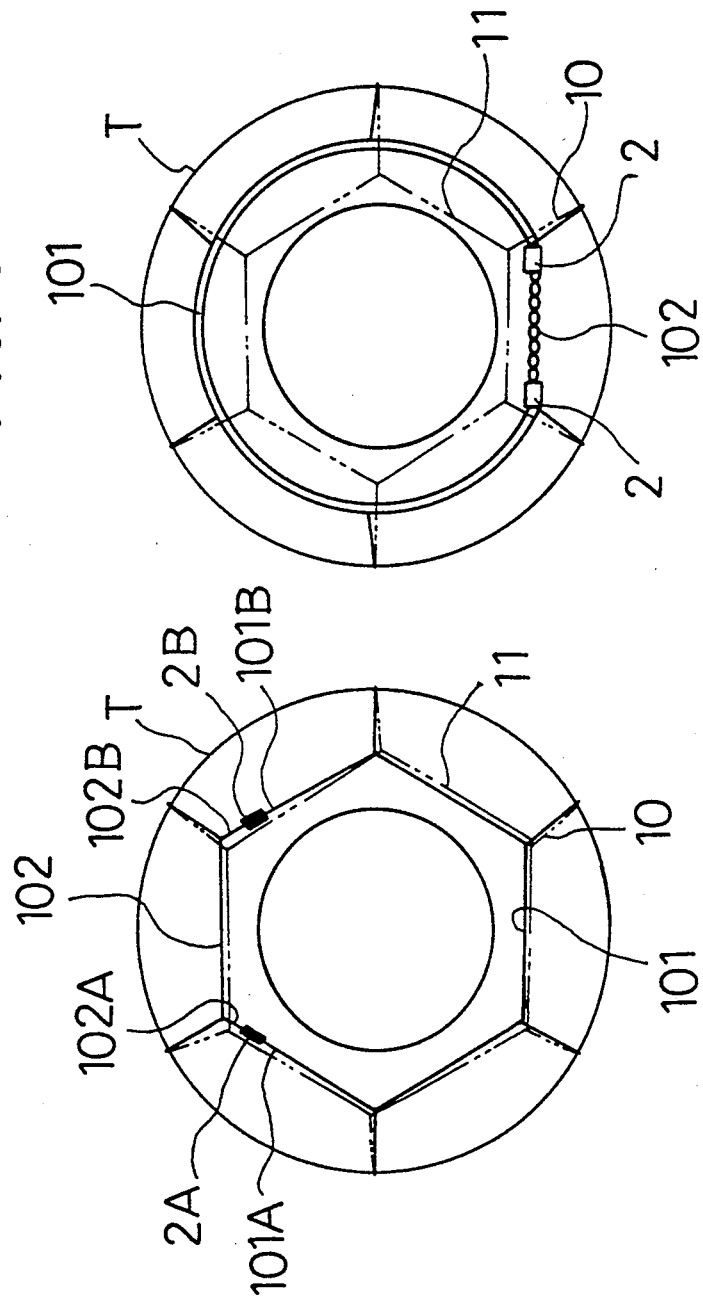

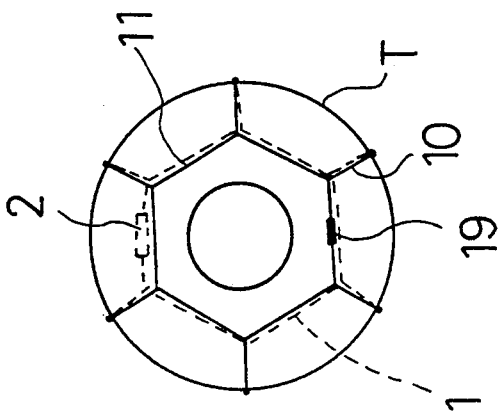
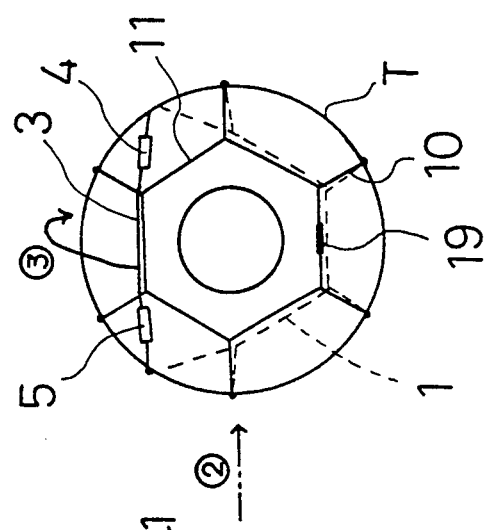
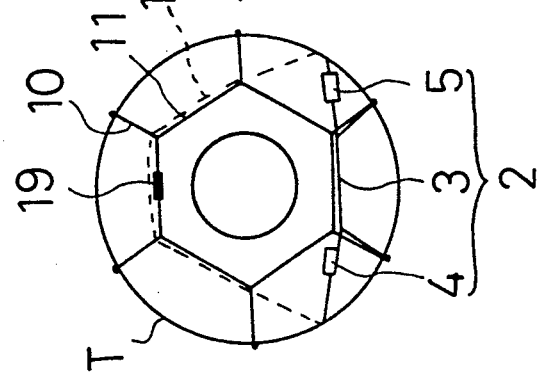

TIRE CHAIN AND THE METHOD OF MOUNTING IT

BACKGROUND OF THE INVENTION

1. Field of the Invention

This invention relates to an inside annular body constituting the inside part of a tire chain.

2. Description of the Prior Art

Japanese Laid-Open Appln. No. 56-160206 teaches a contractile connector for the inner annular body of a tire chain.

The effective length of the chain is changeable by the above contractile connector within a range of a slit of a connecting plate. Therefore, when excessive force is applied to the chain on the occasion of jamming on the brakes, slip, etc., an end portion of the chain moves beyond the checking part of the slit and accordingly the effective length of the chain increases and the tire chain will not function.

SUMMARY OF THE INVENTION

The first object of the present invention is to provide a tire chain having an inside annular body, and a contractile connector which includes an elastic body connected to the inside annular body, and a first connecting member and a second connecting member which move along the elastic body.

The second object of the present invention is to provide a method of mounting the tire chain on a tire which comprises the steps of (1) putting the inside annular body on the tire from the upper side of the tire, while locating more than 180° of the inside annular body at the upper inside part of the tire on which the tire chain is mounted and locating the remainder of (less than 180° of) the inside annular body at the lower outside part of the tire, (2) inverting the inside annular body by executing a half turn of the tire and (3) placing the contractile connector in a contracted and fixed state after moving the remaining part of the inside annular body which is located at the upper outside part of the tire to the inside of the tire.

BRIEF DESCRIPTION OF THE DRAWINGS

FIG. 7 is a front view of the second embodiment of the inside annular body.

FIG. 8 is a front view of the third embodiment of the inside annular body.

FIGS. 9(a)-9(c) are schematic diagrams illustrating the method of mounting the, first embodiment of a tire chain.

DETAILED DESCRIPTION OF THE INVENTION

Figure 1:
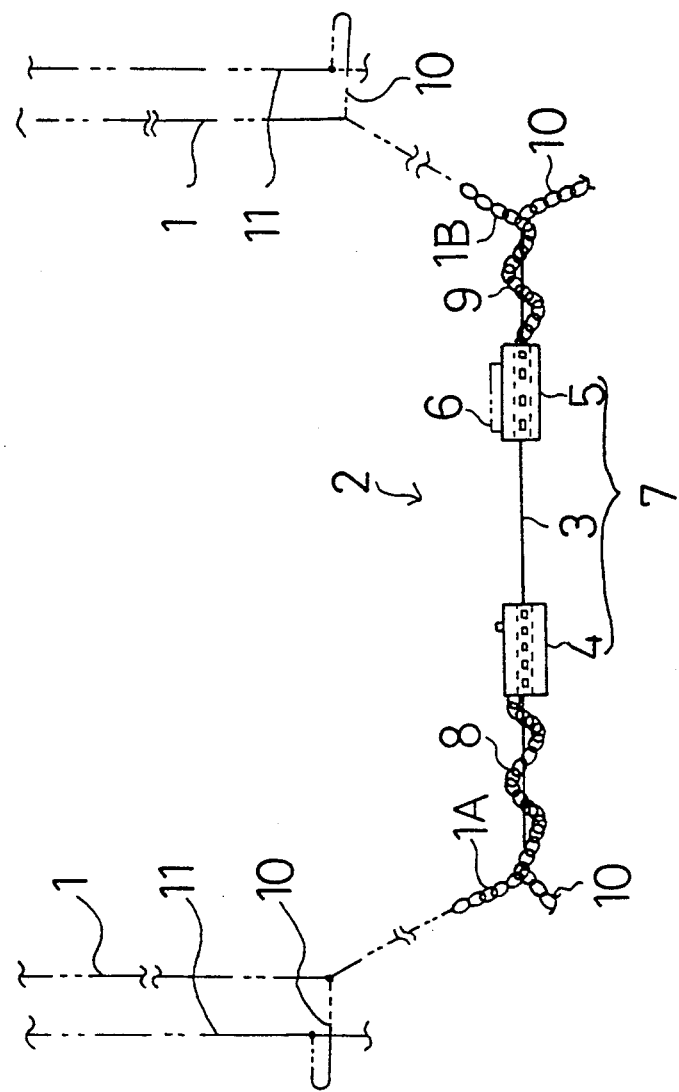
FIG. 1 is a partial perspective view of the first embodiment of a tire chain having an inner annular body according to the present invention.

With reference to FIG. 1, a contractile connector 2 is mounted on a part of an inside annular body 1. The contractile connector 2 includes an elastic body 3 whose ends are connected and fixed to one end 1A and the other end 1B of the inside annular body 1, a first connecting member 4 (female member) which is connected to the one end 1A of the inside annular body 1 and moves along the elastic body 3, a second connecting member 5 (male member) which is connected to the other end 1B of the inside annular body 1 and moves along the elastic body 3, and a connecting and fixing tool 7 which has a lock mechanism 6 for maintaining the connected and fixed state of the first connecting member 4 and the second connecting member 5. In FIG. 1, reference numerals 10 and 11 denote a side chain and an outside annular body, respectively. In the embodiment of FIG. 1, the inside annular body 1 and the outside annular body 11 are chains made of metal or synthetic resin over their entire length. The elastic body 3 is an elastic rope. One end of the first connecting member (female member) 4 is connected to one end 1A of the inside annular body through the medium of a connecting chain 8 and one end of the second connecting member (male member) 5 is connected to the other end 1B of the inside annular body through the medium of a connecting chain 9. The connecting chain 8 and the connecting chain 9 receive the elastic body 3, and the first connecting member (female member) 4 and the second connecting member (male member) 5 are made movable along the elastic body 3 by passing the elastic body (elastic rope) 3 through the first connecting member (female member) 4 and the second connecting member (male member) 5. Thus, the effective length of the inside annular body is capable of expansion and contraction within the range of the length of the connecting chain 8 and the connecting chain 9.

Figure 2:
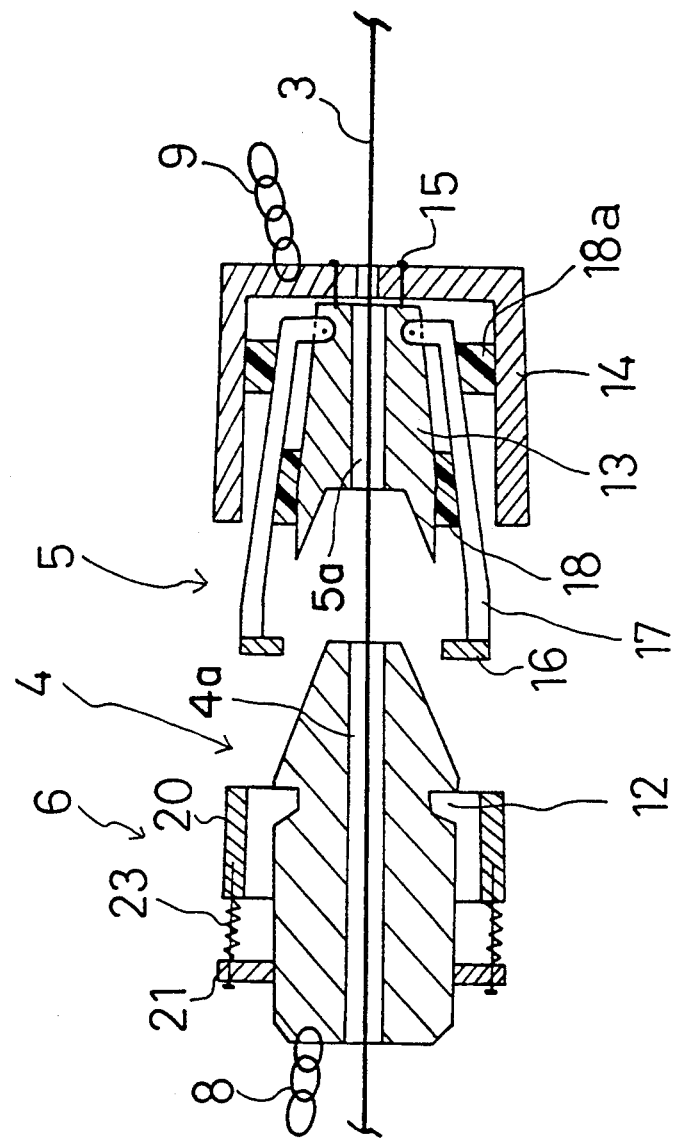
FIG. 2 is a sectional view of a contractile connector which is an essential part of the first embodiment of the present invention.

The first connecting member (female member) 4, the second connecting member (male member) 5 and the connecting and fixing tool 7 will be described below with reference to FIG. 2 and FIG. 3.

The first connecting member (female member) 4 is a tubular body having at its central part a through-hole 4a through which the elastic body (elastic rope) 3 is passed and a checking groove 12 at its circumferential surface. The second connecting member 5 includes an inner tube 13 having a through-hole 5a and an outer tube 14 which are united by a screw 15, and a movable piece 17 having a divided ring 16 which is insertable into the checking groove 12 of the first connecting member (female member) 4 and is interposed between the inner tube 13 and the outer tube 14. The divided ring 16 is urged radially outwardly by an annular elastic body 18 and the base part of the movable piece 17 is fixed to the inner tube 13. A second annular elastic body 18a urges the movable piece 17 radially inwardly (toward a position at which the movable piece 17 is received in the checking groove 12 of the first connecting member 4). The object of the present invention can be attained even if the annular elastic body 18 and/or the second annular elastic body 18a are omitted. It is a matter of course that the annular elastic body can be replaced with a leaf spring or other conventional elastic body.

A tubular body 20 is provided around the outer circumference of the checking groove 12 with some space left therebetween. The ring 21 which is integral with the first connecting member 4 supports the tubular body 20 through the medium of a rod 22 fixed to the tubular body 20 and a spring 23 disposed around the rod 22. These elements constitute the connecting and fixing tool 7 which serves as a lock mechanism for locking the divided ring of the movable piece 17 in the checking groove 12 of the first connecting member 4.

In placing the connecting and fixing tool 7 in a lock releasing state, the tubular body 20 is moved toward the ring 21 against the force of the spring 23, the divided ring 16 is expanded radially outwardly, and as a result, the divided ring 16 is moved out of checking groove 12 and the second connecting member 5 is made free to move.

Figure 4:
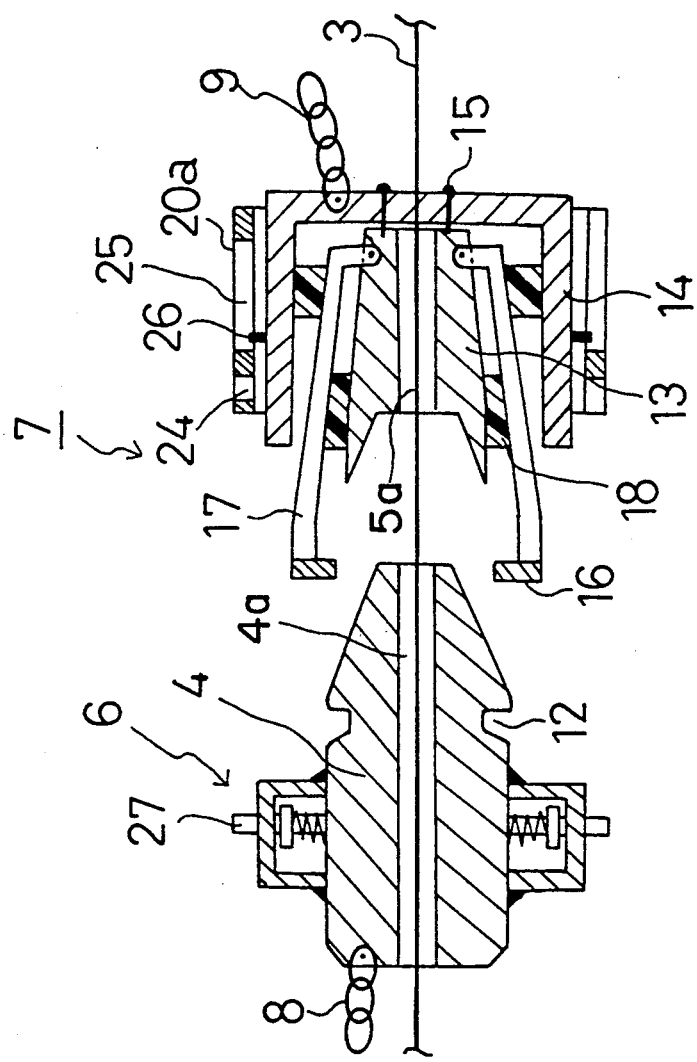
FIG. 4 is a sectional view of the contractile connector which is an essential part of the second embodiment of the present invention.
Figure 5:
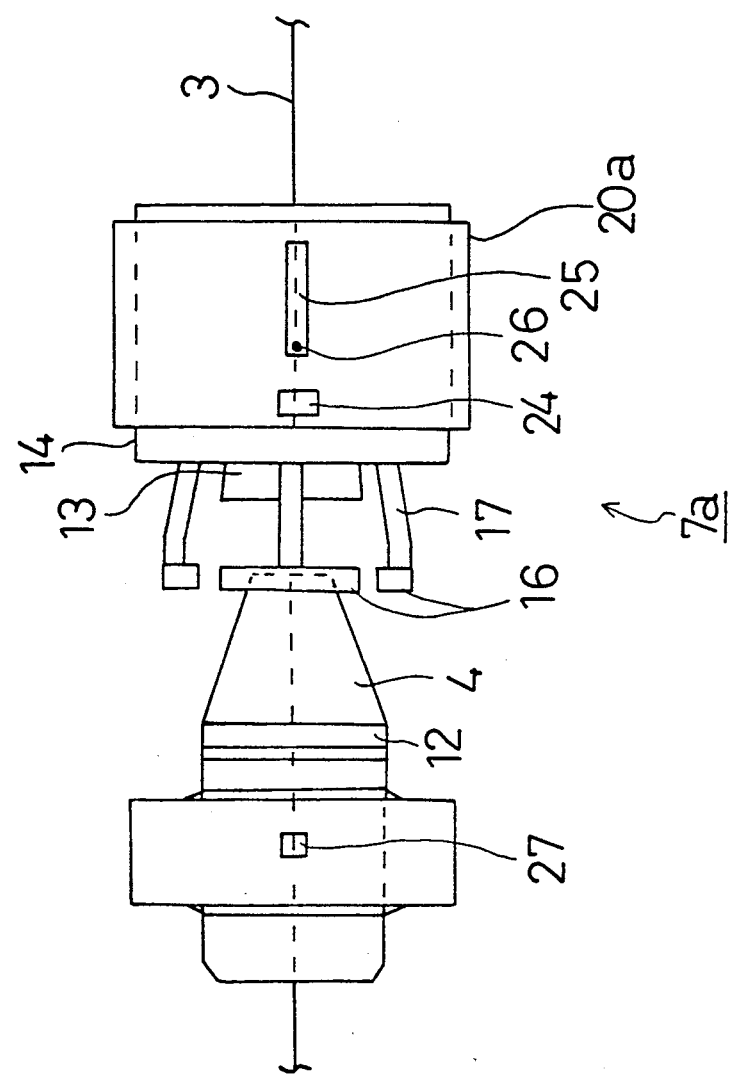
FIG. 5 is a front view of the connector shown in FIG. 4.

In the embodiment shown in FIG. 4 and FIG. 5, a tubular body 20a is loosely fitted to the outer circumference of the second connecting member 5. A slit 25 in the tubular body 20a receives a pin 26 projecting from the outer tube 14 of the second connecting member 5 so that the tubular body is movable in the axial direction of the second connecting member 5. A checking hole 24 receives a pin 27 projecting from the first connecting member. Thus, these elements constitute a connecting and fixing tool 7 which serves as a lock mechanism.

Figure 3:
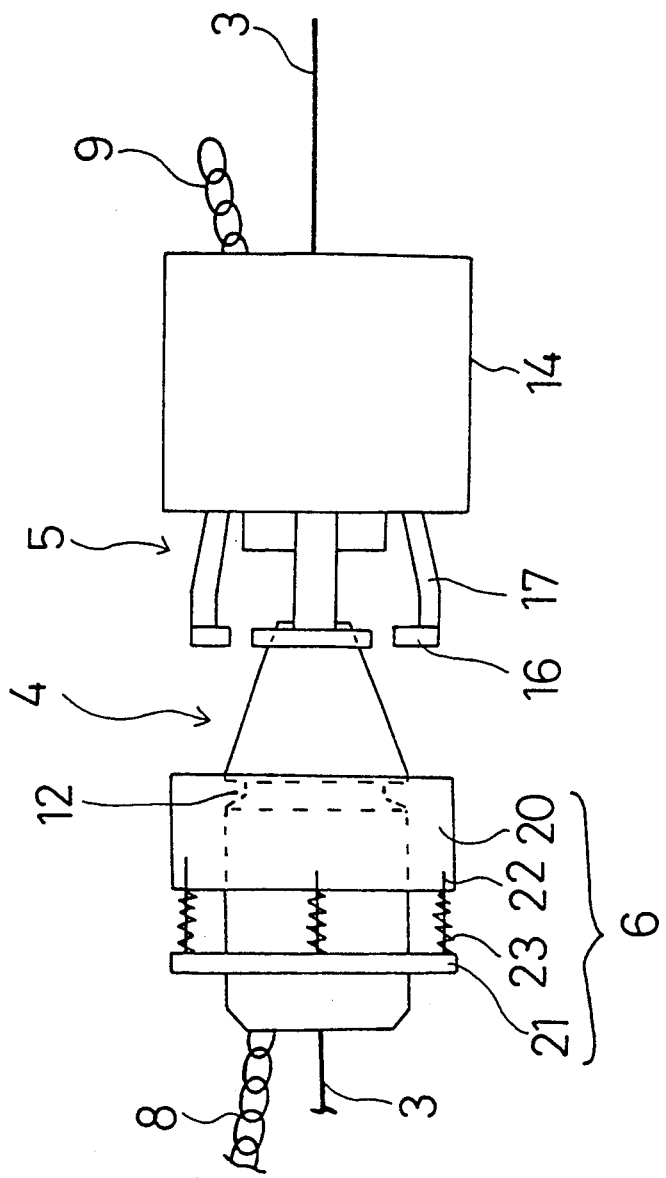
FIG. 3 is a front view of the connector shown in FIG. 2.

In mounting a tire chain on a tire, as shown in FIG. 3 the first connecting member 4 and the second connecting member 5 are in a separated state. Therefore, the first connecting member 4, the second connecting member 5 and the connecting and fixing tool 7 of the contractile connector 2 are in a non-working state but the elastic body 3 is acting on both ends of the inside annular body 1. As a result, by stretching the elastic body 3 the effective length of the inside annular body 1 can be increased and the inside annular body 1 can simply be fitted to the tire.

Figure 6:
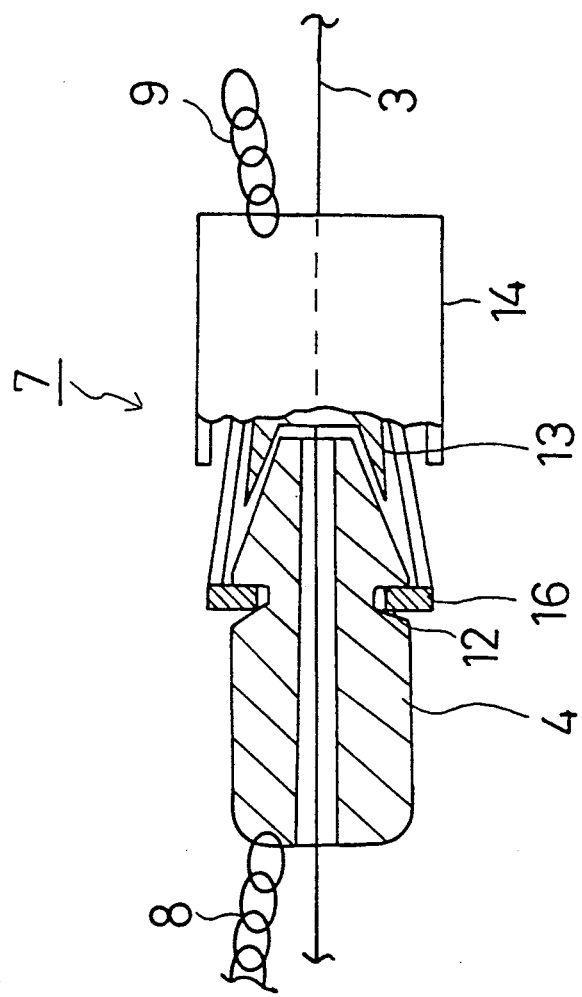
FIG. 6 is a front view, partly in section, of the contractile connector in a working state.

Then, as shown in FIG. 6, the first connecting member 4 and the second connecting member 5 are moved toward each other until the checking groove 12 of the first connecting member 4 receives the divided ring 16 of the second connecting member 5. Then, by moving the tubular body 20a toward the first connecting member 4 as guided by the slit 25 and the pin 26, the tubular body 20 is placed in a locked state, and the first connecting member 4 and the second connecting member 5 are kept in a fixed state.

In the embodiment, the contractile connector is a single unit connecting both ends of the inside annular body 1 but it is a matter of course that contractile connectors can be provided at several parts of the inside annular body 1. For example, in the second embodiment shown in FIG. 7, the inside annular body 1 is divided into two, namely, a first body 101 constituting more than 180° of the inside annular body 1 and a second body 102 constituting less than 180° of the inner annular body 1.

One end 101A of the first body 101 and one end 102A of the second body 102 are connected by a contractile connector 2A whose elastic body 3 is connected to the one end 102A of the first body 101 and the one end 102A of the second body 102, and the other end 101B of the first body 101 and the other end 102B of the second body 102 are connected by the contractile connector 2B whose elastic body 3 is connected to the other end 101B of the first body 101 and the other end 102B of the second body 102.

In the third embodiment shown in FIG. 8, the first body 101 constituting more than 180° of the inside annular body 1 is a rigid curved rod and the second body 102 constituting less than 180° is a chain.

Figure 10A:
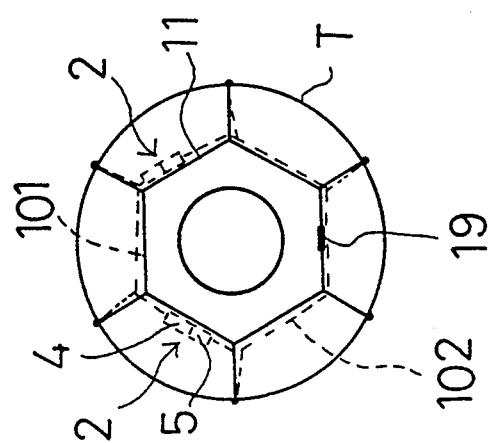
FIGS. 10(a)-10(c) are schematic drawings illustrating the method of mounting the second embodiment of the tire chain.

An explanation is made below as to how to mount a tire chain on a tire according to the present invention. In FIG. 9 and FIG. 10, reference numeral 19 designates an upper mark of the tire chain.

Referring to FIG. 9

(1) By putting the inside annular body 1 on the tire T from the upper side of the tire (as if to pull on a stocking), while keeping the elastic body 3 of the contractile connector 2 in a stretched state, more than 180° of the inside annular body 1 is located at the upper inside part of the tire and the remainder of the inside annular body 1 is located at the lower outside part of the tire (refer to FIG. 9A).

(2) By turning the tire T a half turn by moving the vehicle, the more than 180° of the inside annular body 1 located at the upper part of the tire is moved to the lower inside part of the tire and the remaining part of the inside annular body 1 located at the lower outside part of the tire is moved to the upper outside part of the tire (refer to FIG. 9B).

(3) Then, by moving the remaining part of the inside annular body 1 now located at the upper outside part of the tire to the inside of the tire, the inside annular body 1 is located at the inner side of the tire in its entirety.

(4) Once the inside annular body 1 has been located at the inner side of the tire in its entirety, the contractile connector 2 is placed in a contracted and fixed state (refer to FIG. 9C).

In the above way, a tire chain is mounted on the tire and the inside annular body 1 of the tire chain is fixed in a contracted state.

FIG. 10 illustrates how to mount the second embodiment of a tire chain of the present invention. In this case, the inside annular body 1 comprises the first body 101 constituting more than 180° of the inside annular body 1 and the second body 102 constituting less than 180° of the inside annular body 1.

The following procedure is used to mount the second embodiment.

(1) The first body 101 is disposed at the upper inside part of a tire and the second annular body 102 is disposed at the lower outside part of the tire.

Figure 10B:
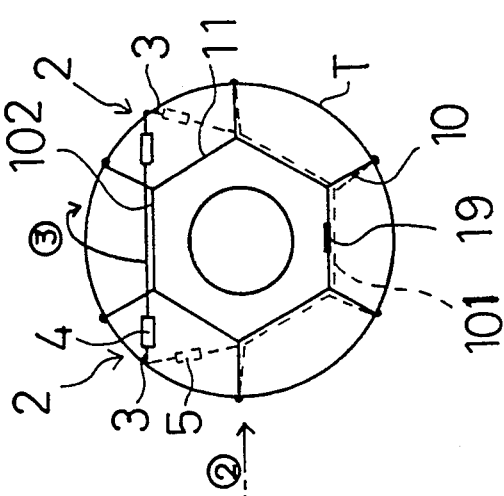

(2) By turning the tire a half turn by moving the vehicle, the first body 101 is moved to the lower inside part of the tire, and the second annular body 102 is moved to the upper outside part of the tire (refer to FIG. 10b).

(3) Then, the second annular body 102 located at the upper outside part of the tire is moved to the inside part of the tire and thus the inside annular body 1 is located at the inner side of the tire in its entirety.

Figure 10C:
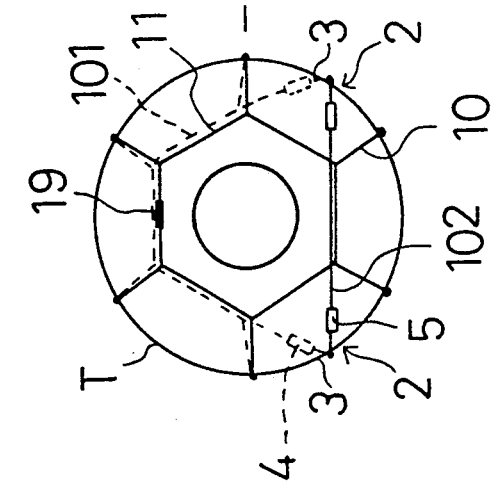

(4) Once the inside annular body has been located at the inner side of the tire in its entirety, the contractile connectors 2 are placed in a contracted and fixed state (refer to FIG. 10c).

Thus, the mounting of the tire chain on the tire is completed. As compared with the first embodiment of FIG. 9, in the case of the second embodiment of FIG. 10 the elastic body 3 (elastic rope) of the contractile connector 2 is in a stretched state and located at the side of the tire in the above steps (1) and (2). Therefore, it is easy to dispose the first annular body 101 at the inner side of the tire and to dispose the second annular body 102 at the outer side of the tire, namely, opposite to each other in relation to the tire.

In the case where the inside annular body 1 of the third embodiment shown in FIG. 8 (only the second body 102 is made of a chain and the first elastic body 101 is made of rigid curved U-shaped rod) is used, the inside annular body 1 hardly slips off during the above step (1) and therefore, the mounting of the inside annular body 1 is easy.

When removing the tire chain from the tire, the lock mechanism of the connecting and fixing tool 7 of the contractile connector 2 is released so as to release the first connecting member from the second connecting member and separate them from each other. Then, by carrying out steps reverse to the steps of the mounting process shown in FIG. 9 and FIG. 10, the tire chain is removed from the tire.

In the present invention, when the tire chain is in use, both ends of the inside annular body are connected through the first connecting member, the connecting and fixing tool and the second connecting member, the elastic body does not act, and the first connecting member and the second connecting member are maintained in a connected and fixed state. Therefore, even if an excessive force is applied to the chain when braking hard, or during slip, etc., the effective length of the inside annular body does not increase and there is no possibility of the tire chain assuming a non-working state.

Both ends of the inside annular body are connected through the medium of the elastic body and the inside annular body is kept annular. Therefore, when mounting the tire chain, the first connecting member and the second connecting member are moved along the elastic body and the effective length of the inside annular body is increased due to the action by the elastic body. This facilitates the connecting of the first connecting member and the second connecting member.

In the method of the present application, the inside annular body 1 is pulled on a tire from the upper side of the tire, a part of the inside annular body is located at the outside of the tire, and the inside annular body is disposed in its entirety at the inside of the tire by turning the tire a half turn and by moving the remaining part of the inside annular body 1 located at the upper outside part of tire toward the inside of tire.

The tire chain can be very easily mounted by locating a part of the inside annular body at the outer side of the tire at the beginning of the tire chain mounting process.

What is claimed is:

1. A tire chain comprising an inside annular body having two opposite ends; and at least one contractile connector for connecting the ends of the inside annular body, each said contractile connector including an elastic body having two ends connected to one of the ends of the inside annular body and to the other of the ends of the inside annular body, respectively, a first connecting member which is movable along said elastic body, a first connecting chain having ends connected to said one of the ends of the inside annular body and to the first connecting member, respectively, so as to connect said first connecting member to said annular body, a second connecting member which is movable along said elastic body, said first and said second connecting members being detachably engageable with one another, a second connecting chain having ends connected to said other of the ends of the inside annular body and to the second connecting member, respectively, so as to connect said second connecting member to said annular body, and a connecting and fixing tool including a lock mechanism which locks the first connecting member and the second connecting member together in a connected state and which maintains the connected state;

wherein when the tire chain is mounted on a tire, said one of the ends of the inside annular body and said other of the ends of the inside annular body are connected via the first connecting member, the first connecting chain, the second connecting member, the second connecting chain and the connecting and fixing tool.

2. A tire chain as defined in claim 1, wherein the elastic body of said contractile connector is an elastic rope extending through said first connecting chain and said second connecting chain, and said elastic rope passing through the first connecting member and the second connecting member.

3. A tire chain as defined in claim 1, wherein said inside annular body includes a first body constituting more than 180° of the inside annular body and a second body constituting the remaining less than 180° of the inside annular body, and said at least one contractile connector comprises two contractile connectors for connecting a first end of said first body to said second body and for connecting a second end of said first body to a second end of said second body, respectively.

4. A tire chain as define din claim 3, wherein said first body is a rigid curved rod and said second body is a chain.

* * * * *